March 31, 1953 — H. KONRAD — 2,632,948

MECHANICAL RAZOR

Filed Jan. 28, 1950

Inventor
Hermann Konrad
By Robert E. Burns
Attorney

Patented Mar. 31, 1953

2,632,948

UNITED STATES PATENT OFFICE 2,632,948

MECHANICAL RAZOR

Hermann Konrad, Moutier, Switzerland

Application January 28, 1950, Serial No. 141,028
In Switzerland December 6, 1948

2 Claims. (Cl. 30—43)

This invention relates to mechanical razors with a head having a fixed cutting plate with several concentric raceways having radial slots, and several cutters movable axially independent of one another, these cutters cooperating with the concentric raceways of the cutting plate against which they are yieldably pressed.

It is an object of my invention to arrange the concentric raceways at levels decreasing from the inner raceway towards the outer raceway, the central front face of the cutting blade being flush with the inner raceway.

It is another object of my invention to make the central front face of the cutting plate flat.

A further object of my invention resides in the provision of reinforcing ribs between the concentric raceways.

A still further object is to provide three raceways, a first series of radial slots traversing the inner raceway, and a second series of radial slots traversing without interruption both the two other raceways.

Another object is to provide three concentric raceways, every two adjacent raceways being separated by reinforcing ribs.

Figure 1:
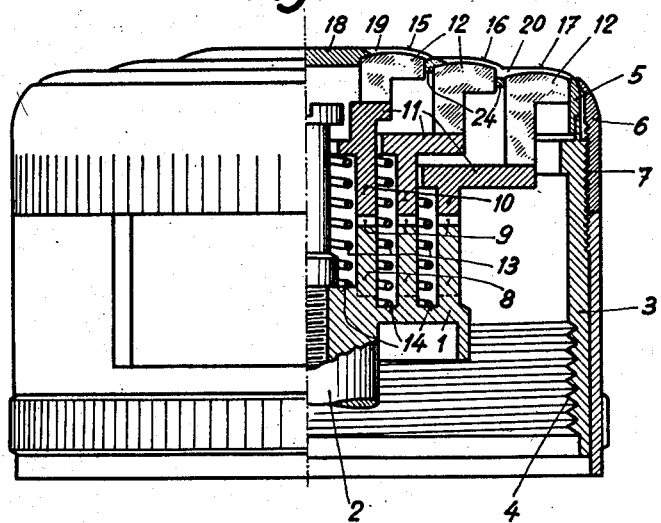
Figure 2:
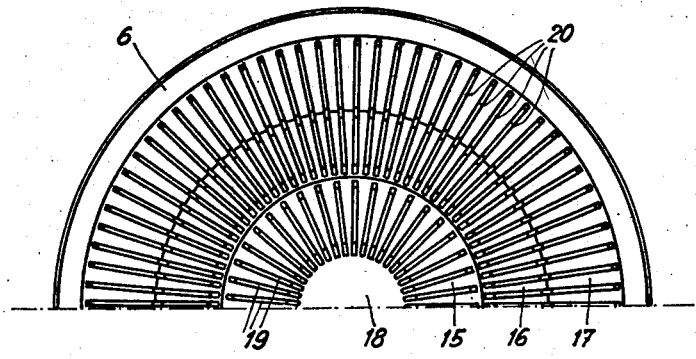
Figure 3:
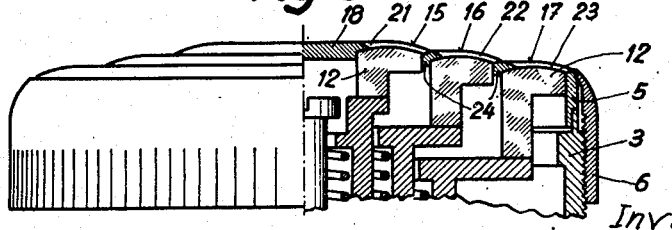

Other objects and features will be apparent as the following description proceeds, reference being had to the accompanying drawings illustrating by way of example two embodiments of my invention, and wherein Fig. 1 is an elevation, partly in section, of the head portion of a mechanical razor, Fig. 2 is an end view of the cutting plate of the head shown in Fig. 1, and Fig. 3 is a view similar to Fig. 1 of another head portion.

Referring now to the drawing, 1 designates a coupling member integral or otherwise coupled with the drive shaft 2. A sleeve 3 has a threaded portion 4 to be screwed to the razor body not shown. A fixed cutting plate 5 is supported by a shoulder on the upper rim of the sleeve 3 and pressed onto this rim by the upper inwardly bent portion of a ring 6 having screw threads 7 engaging similar screw threads of the sleeve 3.

The coupling member 1 comprises driving tongues 8 spaced by recesses 14. These tongues enter notches 9 of the sleeve portion 10 of several (three) cutter-carrying members 11 concentric to one another and axially adjustable independently of one another. The cutter-carrying members 11 carry rims or crowns of cutters 12 arranged at a distance from one another. These cutters 12 engage the inner surface of the cutting plate 5. Helical springs 13 bearing against the members 11 and against the bottom of the annular recesses 14 of the coupling member 1 press the cutters 12 yieldably against the inner surface of the cutting plate 5. The cutters 12 fixed to one of the members 11 are thus quite independent of the cutters of another member 11.

The above-described organisation of the different parts is shown and described in detail in my Patent 2,536,015, granted December 26, 1950, a division of application Serial No. 573,703, filed January 20, 1945, and now abandoned.

The cutting edges of the cutters 12 engage and move along the inner surface of raceways 15, 16, 17 of the cutting plate 5, these raceways lying concentrically to one another and being slightly concave.

The raceways are arranged at stages with regard to one another, with their levels decreasing from the innermost raceway 15 down to the outermost 17. The central front face 18 of the razor head, forming part of the cutting plate 5, is flush with the outer surface of the innermost raceway 15 and is by preference flat. The face 18 is thus tangential to the outer surface of the raceway 15. There is no groove or the like between adjacent raceways on the outer surface of the cutting plate 5, that is, on going on the upper surface of the plate 5 from the outer rim of the latter towards the center one does not descend before arriving on the next raceway.

Radial slots are cut out in the raceways 15, 16, 17. In Figs. 1 and 2 there are two circular concentric series, viz.: the slots 19 of the innermost raceway 15, and the slots 20 extending without interruption through both the raceways 16 and 17. Between the slots 19 and 20 there is reinforcing rib 24.

The embodiment of Fig. 3 merely differs from Fig. 1 by three series of radial slots 21, 22, 23, each of them traversing but one raceway. In order to avoid an undue weakening of the plate 5 by all these slots arranged close together, reinforcing ribs 24 are provided between the raceways 15, 16 and 16, 17. These ribs allow the slots to be made rather long. Also in this embodiment there are no grooves or the like between adjacent raceways on the outer surface of the cutting plate.

When the front face of the razor head is applied to the skin, the different stages give the skin a rounded shape and form beads on it, making the hairs project to facilitate cutting. My novel cutting plate smoothly glides over the skin and avoids any irritation of the latter.

While I have described and illustrated two embodiments of my invention, I do not wish to unnecessarily limit the scope of this invention, but reserve the right to make such modifications and rearrangements of the several parts as may come within the purview of the accompanying claims.

What I claim is:

1. In a mechanical razor comprising a circular fixed cutting plate having an axial front face and concentric raceways disposed radially outwardly from said front face, said raceways comprising radial slots, cutters axially movable independently of one another in engagement with said raceways, means pressing said cutters yieldedly against said raceways, each of said raceways being disposed at a different level with respect to said axial front face, the level of said raceways decreasing continuously radially outwardly from said axial front face, each of said raceways having a sloping surface and the line of juncture between one raceway and the next inner raceway being at the level of the face of the first raceway and said juncture defining an oblique angle, the raceway adjacent said axial front face coinciding at its point of juncture with the surface of said axial front face and sloping gradually radially outwardly to a lower level at the juncture with the next concentric raceway, whereby said razor is free from depressions between adjoining raceways, the inner-most raceway being substantially flush with the surface of said axial front face.

2. In a mechanical razor according to claim 1, said raceways being in the number of three, a first series of radial slots traversing the inner raceway, and a second series of slots traversing without interruption both the other raceways, said cutting plate comprising a reinforcing rib between the inner and the adjacent raceway.

HERMANN KONRAD.

REFERENCES CITED

The following references are of record in the file of this patent:

UNITED STATES PATENTS

| Number | Name | Date |
| --- | --- | --- |
| 2,370,331 | Susunaga | Feb. 27, 1945 |
| 2,536,015 | Konrad | Dec. 26, 1950 |

FOREIGN PATENTS

| Number | Country | Date |
| --- | --- | --- |
| 598,664 | Great Britain | June 21, 1945 |
| 598,665 | Great Britain | June 21, 1945 |

OTHER REFERENCES

Ser. No. 261,386, Loinaz (A. P. C.), published June 1, 1943.